No. 867,823. PATENTED OCT. 8, 1907.
S. HICKS.
JOURNAL BOX.
APPLICATION FILED JUNE 22, 1907.
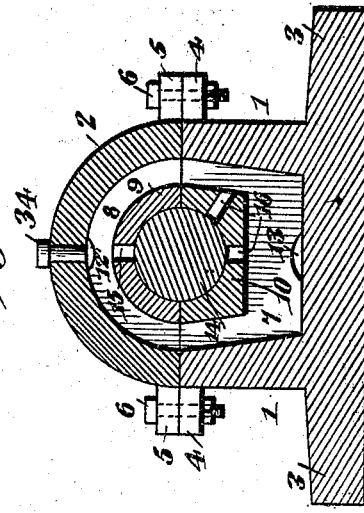
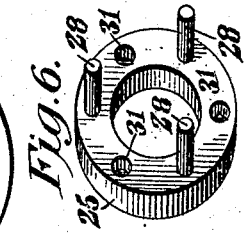
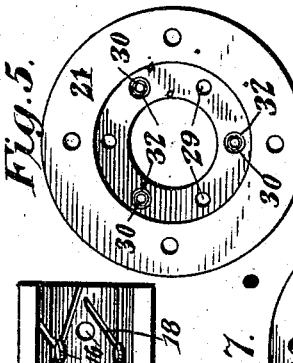
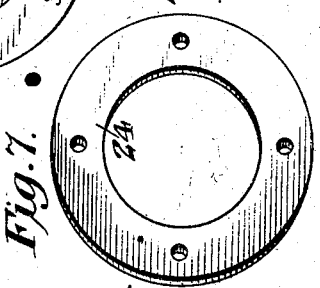
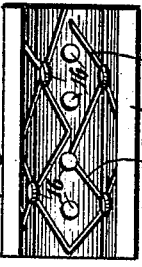
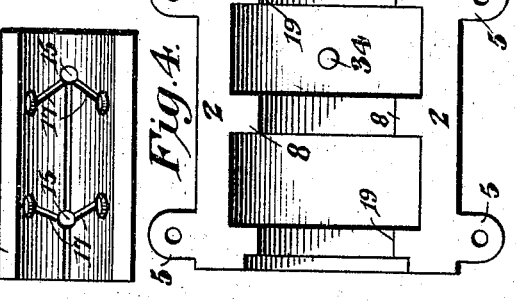
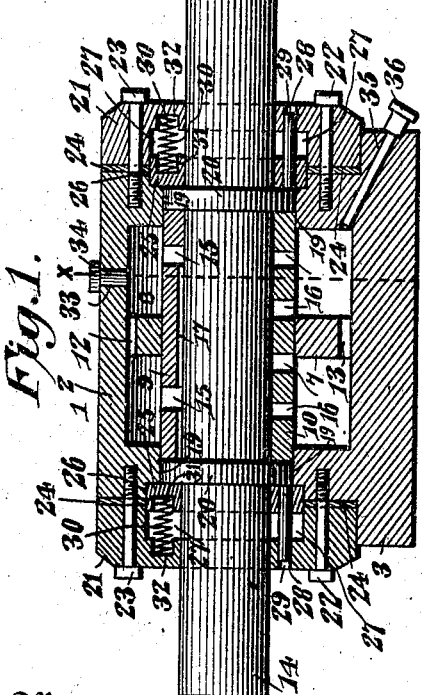
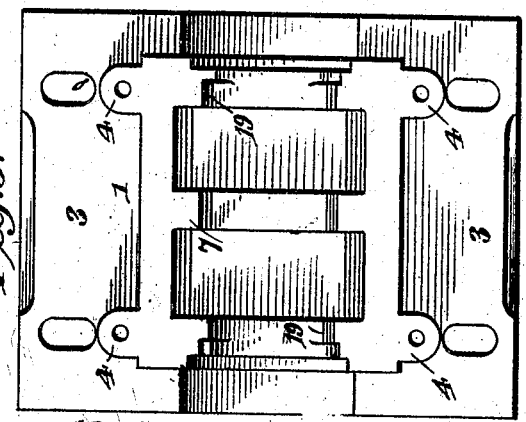
Witnesses
Jas. F. McCathran
H. T. Riley
Shelby Hicks, Inventor
By E. G. Siggers
Attorney

UNITED STATES PATENT OFFICE.

SHELBY HICKS, OF PROVIDENCE, KENTUCKY.

JOURNAL-BOX.

No. 867,823.  Specification of Letters Patent.  Patented Oct. 8, 1907.

Application filed June 22, 1907. Serial No. 380,276.

*To all whom it may concern:*

Be it known that I, SHELBY HICKS, a citizen of the United States, residing at Providence, in the county of Webster and State of Kentucky, have invented a new and useful Journal-Box, of which the following is a specification.

The invention relates to improvements in journal boxes.

The object of the present invention is to improve the construction of journal boxes, and to provide a simple and comparatively inexpensive one, designed particularly for use in connection with high speed and other shafts and journals, and adapted to contain a considerable quantity of oil, so that a shaft or journal will require but little attention to maintain it in a thoroughly lubricated condition.

A further object of the invention is to provide a journal box of this character, adapted to prevent any waste of oil, and capable of excluding dust and grit from the bearing.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a longitudinal sectional view of a journal box, constructed in accordance with this invention. Fig. 2 is a transverse sectional view, taken substantially on the line $x$—$x$ of Fig. 1. Fig. 3 is a plan view of the body portion of the journal box, the cap or upper section being removed. Fig. 4 is a reverse plan view of the cap or upper section of the journal box. Fig. 5 is a detail view of one of the end plates or heads, showing the inner face of the same. Fig. 6 is a detail perspective view of one of the metallic packing rings. Fig. 7 is a detail view of one of the gaskets. Figs. 8 and 9 are detail views of the brasses or members of the bearing sleeve.

Like numerals of reference designate corresponding parts in all the figures of the drawing.

1 designates a journal box, consisting of a casing and provided with a removable cap or upper section 2.

The body or lower section of the journal box is provided with an enlarged base 3, forming an attaching flange, which is provided with suitable openings for the reception of bolts, or other fastening devices for mounting the journal box in position.

The body of the journal box and the upper section or cap are provided with corresponding ears 4 and 5, having registering perforations for the reception of bolts 6, which detachably secure the sections or members of the journal box together.

The lower section or body and the upper section or cap are provided with centrally arranged transverse ribs 7 and 8, forming an intermediate support and brace for upper and lower journal brasses 9 and 10, and dividing the space within the journal box into two oil chambers 11. The interior of the journal box constitutes an oil reservoir, and the oil chambers 11 communicate with each other by means of upper and lower openings 12 and 13.

The upper and lower journal brasses 9 and 10 constitute a bearing sleeve for a shaft 14, and the said bearing sleeve, which may be constructed of any other suitable material, is provided with perforations 15 and 16 to permit the oil to pass freely through the journal brasses or members 9 and 10 to the shaft. The brasses or members of the sleeve, which are also provided with interior oil grooves 17 and 18, fit in the openings 19 of the journal box, and the said ribs 7 and 8 conform to the configuration of the bearing sleeve. The upper member or journal brass of the bearing sleeve is preferably semi-cylindrical, and the lower member, which is provided with a polygonal exterior, may, of course, be of any other preferred configuration. The ends of the bearing sleeve terminate short of the end faces of the journal box, and the shaft is provided with spaced collars 20, arranged within the end openings of the journal box and fitting against the ends of the bearing sleeve.

The ends of the journal box are closed by plates or heads 21, which are circular and which are secured to the body portion and the cap of the journal box by screws 22 and 23, suitable oil gaskets 24 being interposed between the heads or plates and the ends of the journal box to prevent leakage of the oil and also to exclude dust and grit from the bearing. These gaskets prevent leakage of oil from the journal box except around the shaft, and in order to render the journal box oil tight and dust proof at these points, metallic packing rings 25 are provided. The rings 25, which are arranged snugly on the shaft, are slidable longitudinally thereof, but are held against rotary movement by the means hereinafter described, and they fit in recesses 26 of the ends of the journal box and abut against the sections or members thereof and also against the outer faces of the collars 20 to form lap joints, as clearly illustrated in Fig. 1 of the drawing. The rings are ground to fit snugly within the recesses 27 of the heads or plates 21, and they are provided with projecting pins 28, slidable in perforations 29 of the plates or heads 21 and adapted to hold the rings against rotary movement. The rings are held in close contact with the ends of the journal box and with the collar 20 by means of coiled springs 30, located within the recesses 27 of the end plates or heads and having their terminals fitted in suitable sockets 31 and 32 of the said rings and the said end plates or heads 21. The rings prevent leakage of oil at the shaft, and they also exclude dust from the bearing.

The cap is provided with a filling opening 33, normally receiving a suitable plug or closure 34 and adapted to permit oil to be readily supplied to the journal box. The journal box is also provided at the base with an outlet passage 35 to enable the oil to be drained off. The outlet passage is normally closed by a plug 36, or other suitable means.

As the journal box is adapted to hold a considerable quantity of oil, it requires but little attention at comparatively long intervals, and as the drain opening will permit the oil to be drawn off previous to filling the journal box with fresh oil, there will be no waste of the lubricant, as the oil drawn off may be filtered and used again.

The journal box is adapted for use at the ends of the shafts or journals or analogous rotary members and at points intermediate of the ends of a shaft, and when arranged in the latter position, the rings may be made sectional to enable them to be conveniently fitted around the shaft.

Having thus fully described my invention, what I claim as new and desire to secure by Letters Patent, is:—

1. The combination of a journal box comprising a removable cap and provided with an interiorly arranged rib dividing the journal box into separate oil chambers, a bearing sleeve supported by the said rib and by the ends of the journal box, a rotary member provided with collars fitting against the ends of the bearing sleeve, and closures for the ends of the journal box.

2. The combination of a journal box, a rotary member provided with spaced collars located at the ends of the journal box, closures for the ends of the journal box, and yieldably mounted rings surrounding the rotary member and fitting against the collars and the journal box to form a lap joint.

3. The combination of a journal box, a rotary member provided with spaced collars located at the ends of the journal box, closures for the ends of the journal box, rings fitting against the collars and the journal box, slidable means connected with the rings for holding the same against rotary movement, and yieldable means for holding the rings against the said collars and the journal box.

4. The combination of a journal box, a rotary member provided with spaced collars located at the ends of the journal box, closures for the ends of the journal box, rings fitting against the collars and the journal box and provided with pins slidable in the said closures, and yieldable means for holding the rings tightly against the collars and the journal box.

5. The combination of a journal box, a rotary member provided with spaced collars located at the ends of the journal box, closures for the ends of the journal box, rings fitting against the collars and the journal box, means for holding the rings against rotary movement, and coiled springs interposed between the rings and the closures and having their ends fitted in the same.

6. The combination of a journal box provided at its ends with recesses, a rotary member having collars located at the ends of the journal box, a bearing sleeve arranged within the journal box and fitting within the said collars, closures secured to the ends of the journal box, gaskets arranged between the closures and the journal box, rings fitting in the recesses of the journal box and engaging the collars, pins extending from the rings and guided in the closures, and springs interposed between the closures and the rings and housed within the former.

In testimony, that I claim the foregoing as my own, I have hereto affixed my signature in the presence of two witnesses.

SHELBY HICKS.

Witnesses:
HENRY GIVENS,
ROSS GIVENS.